(12) United States Patent
Alford, Jr. et al.

(10) Patent No.: US 7,103,847 B2
(45) Date of Patent: Sep. 5, 2006

(54) METHOD AND SYSTEM FOR MONITORING THE USE OF A RESOURCE IN A PROCESSING SYSTEM

(75) Inventors: Jack Allen Alford, Jr., Austin, TX (US); Kenneth Ray Banning, Austin, TX (US); James Lee Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 10/199,399

(22) Filed: Jul. 18, 2002

(65) Prior Publication Data

US 2004/0012637 A1    Jan. 22, 2004

(51) Int. Cl.
*G06F 3/00*    (2006.01)
(52) U.S. Cl. ...................... 715/772; 715/966
(58) Field of Classification Search ............... 715/772, 715/736, 738, 769, 711, 716, 966
See application file for complete search history.

(56) References Cited

U.S. PATENT DOCUMENTS

| | | | | |
|---|---|---|---|---|
| 5,550,970 A * | 8/1996 | Cline et al. | ................. | 715/772 |
| 5,751,965 A * | 5/1998 | Mayo et al. | ................. | 709/224 |
| 5,819,043 A * | 10/1998 | Baugher et al. | ............ | 709/222 |
| 6,097,390 A * | 8/2000 | Marks | ........................ | 715/772 |
| 6,337,699 B1 * | 1/2002 | Nielsen | ...................... | 715/837 |
| 6,404,444 B1 * | 6/2002 | Johnston et al. | ............ | 715/839 |
| 6,414,697 B1 * | 7/2002 | Amro et al. | ................. | 715/772 |
| 6,606,658 B1 * | 8/2003 | Uematsu | ..................... | 709/225 |
| 6,690,400 B1 * | 2/2004 | Moayyad et al. | ........... | 715/779 |
| 6,934,916 B1 * | 8/2005 | Webb et al. | ................. | 715/772 |
| 2002/0180795 A1 * | 12/2002 | Wright | ........................ | 345/772 |
| 2003/0048714 A1 * | 3/2003 | Conti | ......................... | 369/53.1 |
| 2003/0142141 A1 * | 7/2003 | Brown et al. | ................ | 345/805 |
| 2003/0142143 A1 * | 7/2003 | Brown et al. | ................ | 345/836 |
| 2004/0003063 A1 * | 1/2004 | Ashok et al. | ............... | 709/221 |
| 2004/0207662 A1 * | 10/2004 | Anderson et al. | ........... | 345/772 |
| 2005/0102631 A1 * | 5/2005 | Andreas et al. | ............. | 715/772 |

* cited by examiner

*Primary Examiner*—Sy D. Luu
(74) *Attorney, Agent, or Firm*—Sawyer Law Group LLP (57) ABSTRACT

A system for monitoring a resource in a processing system is disclosed. The processing system includes a display. The system comprises a total resource graphic provided on the display. The total resource graphic represents the total resource. The system includes at least one allocation graphic provided within the total resource graphic. The allocation graphic represents the proportion of the resources allocated to an object. The system and method in accordance with the present invention allows for allocation of a resource across all demands, the relative size of the allocations, and the usage of the resource by the individual demanding operation within a single graphical object. In addition, the object would provide for changes to that allocation by direct manipulation, in addition, the status indicator would provide additional information on demand by the user. The graphical object will provide a single view of the total resource available, the allocation of that resource to individual operations, and the amount of the allocated resource to each operation currently in use. Therefore, in a preferred embodiment, a computer is used to perform the numeric calculations of the allocations and provides a single picture to the user. The user can then derive information regarding the relative importance of any single element. This enables the computer and the user or users to perform the functions for which they are best suited within the operation (computers are best suited to perform calculations; humans users of computers are bested suited to seek patterns and assign relevance to their needs).

30 Claims, 7 Drawing Sheets

METHOD AND SYSTEM FOR MONITORING THE USE OF A RESOURCE IN A PROCESSING SYSTEM

FIELD OF THE INVENTION

The present invention relates in general to a configurable device for tracking and monitoring dynamic properties of resources and events coupled to a computing environment.

BACKGROUND OF THE INVENTION

Computers are a regular part of the everyday life of many people. Computers are typically used in one's home as well as one's business or work place. A computer monitor is one of the main interfaces used to enable a person to interact with the computer. The computer monitor has a display screen for displaying information, usually in graphic format, to the user. Input devices, such as a mouse and a keyboard, are also devices that are used to interface a user with the computer.

The junction between a user and a computer is commonly referred to as a user interface. A user interface is typically in the form of a set of commands and menus through which a user communicates with the computer. A command-driven interface is one in which a user enters commands. A menu-driven interface is one in which a user selects command choices from various menus displayed, on the screen. The user interface is one of the most important parts in a computer system because it determines how easily a user can make the program do what the user wants. Graphical user interfaces (GUIs) that use windows, icons, and pop-up menus have become standard on personal computers.

User interfaces are typically used in computing environments for easy navigation, control, display of status information, etc., of software programs and applications of a given operating system. One type of user control in computing environments includes resource and event monitoring and tracking of internal resources and events. In one example, a computing environment can be used to monitor external resources or events, such as medical data or manufacturing data. These resources and events need to be monitored and tracked by the user. If the data falls below a threshold or emergency level, the computing environment needs to make the user aware in an efficient manner to avoid detrimental results.

Typically, internal computing resources need to be monitored by an administrative user. In typical computing environments, the resources can fall below ideal and working threshold levels, depending on usage. When the resources fall below these threshold levels, the computing environment can become unstable. This can cause severe problems not only in single user environments, but also in multi-user networking environments.

Many of the most time consuming and critical tasks for computer system operators and users result from the need to monitor a set of related resources for excessive use of limited resources and/or setting of allocation of that resource to multiple operations.

The current practice is either to look at individual reports for each demand, or to look at a composite table showing all the allocations in an alpha-numeric form. In both cases, the user is left with the task of calculating the relative values against a known total available and determining the corresponding importance.

Accordingly, what is needed is a system and method for reducing the time required for monitoring a set of related resources and for allocating the resource to multiple operations in a processing system. The system and method should be easy to implement, cost effective and compatible with existing processing environments. The present invention addresses such a need.

SUMMARY OF THE INVENTION

A system for monitoring a resource in a processing system is disclosed. The processing system includes a display. The system comprises a total resource graphic provided on the display. The total resource graphic represents all of the resource in the system. The system may include at least one specific allocation graphics provided within the total resource graphic. The specific allocation graphic represents the proportion of the resources allocated to an object.

The system and method in accordance with the present invention allows for allocation of a resource across all demands, the relative size of the allocations, and the usage of the resource by the individual demanding operation within a single graphical object. In addition, the object would provide for changes to that allocation by direct manipulation. In addition, the status indicator would provide additional information on demand by the user. The graphical object will provide a single view of the total resource available, the allocation of that resource to individual operations, the amount of the allocated resource to each operation currently in use, and an indication of trends in the usage of the resource.

Therefore, in a preferred embodiment, a computer is used to perform the numeric calculations related to the display and modification of the allocations and provides a single picture to the user. The user can then derive information regarding the status of any single element. This enables the computer and the user or users to perform the functions for which they are best suited within the operation (computers are best suited to perform calculations; humans users of computers are best suited to seek patterns and make decisions according to their goals and needs).

DETAILED DESCRIPTION

The present invention relates in general to a configurable device for tracking and monitoring dynamic properties of resources and events coupled to a computing environment. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
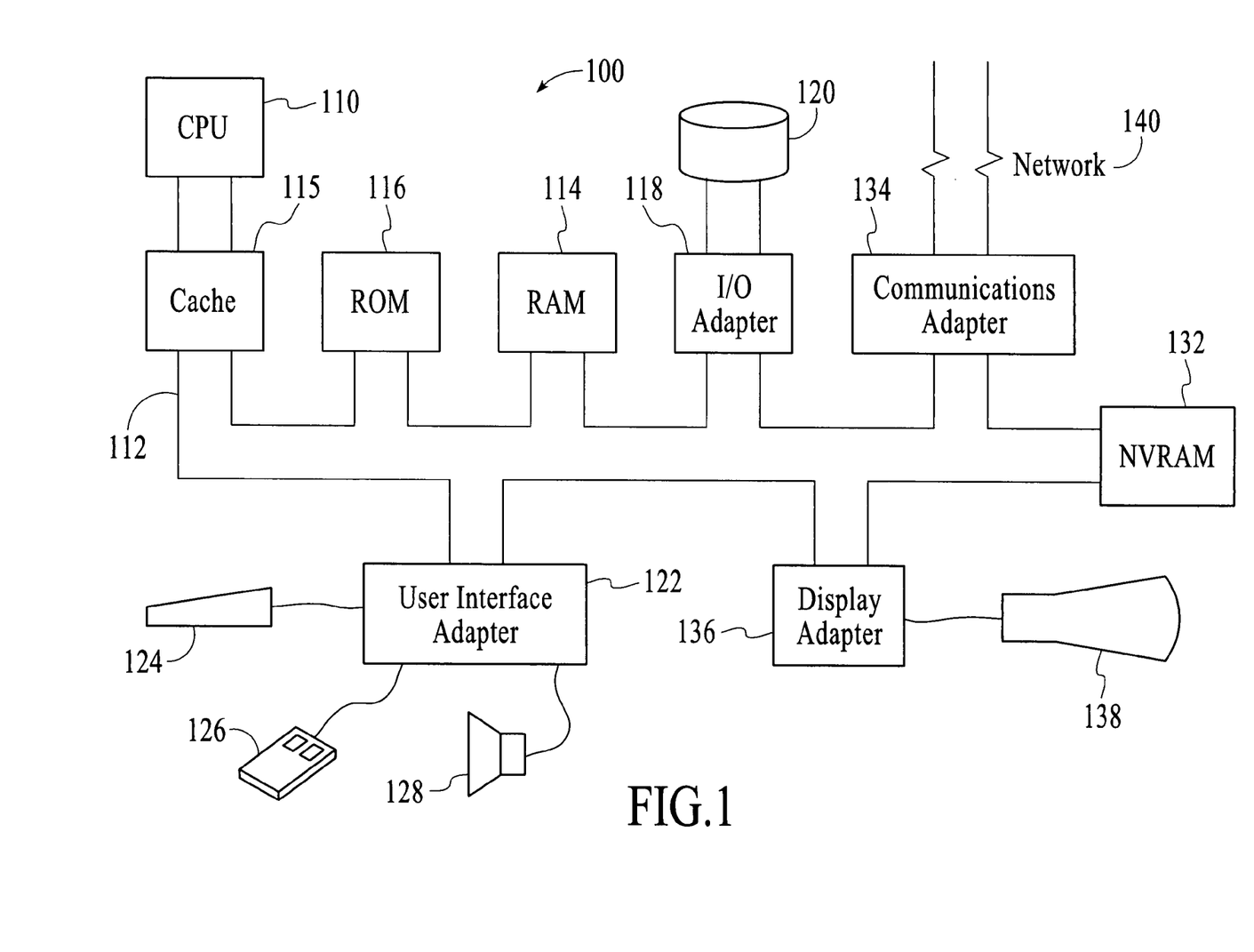
FIG. 1 illustrates a conventional hardware configuration for use with the present invention.

The preferred embodiments may be practiced in any suitable hardware configuration that uses a networked connection, such as computing system 100 illustrated in FIG. 1 or alternatively, in a laptop or notepad computing system. Computing system 100 includes any suitable central processing unit 110, such as a standard microprocessor, and any number of other objects interconnected via system bus 112.

For purposes of illustration, computing system 100 includes memory, such as read only memory (ROM) 116, random access memory (RAM) 114, non-volatile random access memory (NVRAM) 132 and peripheral memory devices (e.g., disk or tape drives 120) connected to system bus 112 via I/O adapter 118. The cache 115 is a special section of random access memory. Computing system 100 further includes a display adapter 136 for connecting system bus 112 to a conventional display device 138. Also, user interface adapter 122 could connect system bus 112 to other user controls, such as keyboard 124, speaker 128, mouse 126, and a touch pad (not shown). In addition, the system 100 can be connected via a communications adapter 134 to a network 140.

One skilled in the art readily recognizes how conventional computers and computer programs operate, how conventional input device drivers communicate with an operating system, and how a user conventionally utilizes input devices to initiate the manipulation of objects in a graphical user interface.

A graphical user interface (GUI) and operating system (OS) of the preferred embodiment reside within a computer-readable media and contain device drivers that allow one or more users to initiate the manipulation of displayed object icons and text, on a display device. Any suitable computer-readable media may retain the GUI and OS, such as ROM 116, RAM 114, disk and/or tape drive 120 (e.g., magnetic tape, magnetic diskette, CD-ROM, optical disk, or other suitable storage media).

In the preferred embodiment, the GUI may be viewed as being incorporated and embedded within the operating system. Alternatively, any suitable operating system or desktop environment could be utilized.

In its most basic form, a system and method in accordance with the present invention is a graphics shape within a user interface that represents a limited resource. The graphics shape contains a label that identifies a resource name. As resource is allocated to the first object using it, a new graphics shape appears within the total resource graphic. This specific allocation graphic is proportional in area to the area of total resource graphic as the amount of its allocation is proportional to the amount of the total resource available. In the present application, the graphic shapes are described as rectangles. One of ordinary skill in the art readily recognizes that a variety of shapes could be utilized and their use would be within the spirit and scope of the present invention.

Figure 2:
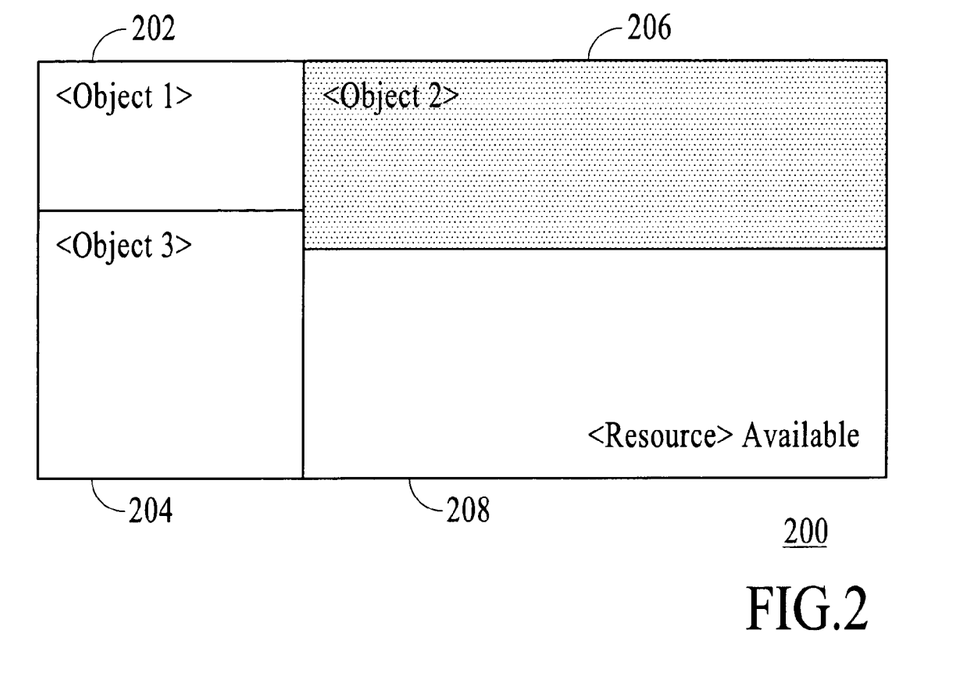
FIG. 2 illustrates a general graphics box which illustrates a resource and three graphics boxes which illustrate objects with allocations from the resource.

FIG. 2 illustrates a rectangular total resource graphic 200 which illustrates a resource and a plurality of specific allocation rectangles 202, 204 and 206 therewithin. The specific allocation rectangles 202, 204 and 206 illustrate objects allocated from the resource. As other objects have resource allocated they are added in a similar fashion. In a preferred embodiment, the total resource graphic 200, from top left to bottom right, is updated as specific allocation graphics are added into the resources available area 208. The specific allocation graphics are dynamic, showing updates in area according to a predetermined schedule (which schedule could be determined by the user of the program).

In this embodiment, the number of specific allocation graphics represents the number of objects with allocations, the sum of the areas of the one or more specific allocation graphics represents the amount of the resource allocated relative to the total resource available. A label of the one or more specific allocation graphics indicates the name or identifier of each object or objects using the resource. In this embodiment, the density of the fill pattern within each specialized internal box represents the use of the allocated resource relative to the allocation, clear representing no use to solid fill representing complete use of the resource. To describe these features in more detail, refer now to the following discussion in conjunction with the accompanying figures.

Figure 2A:
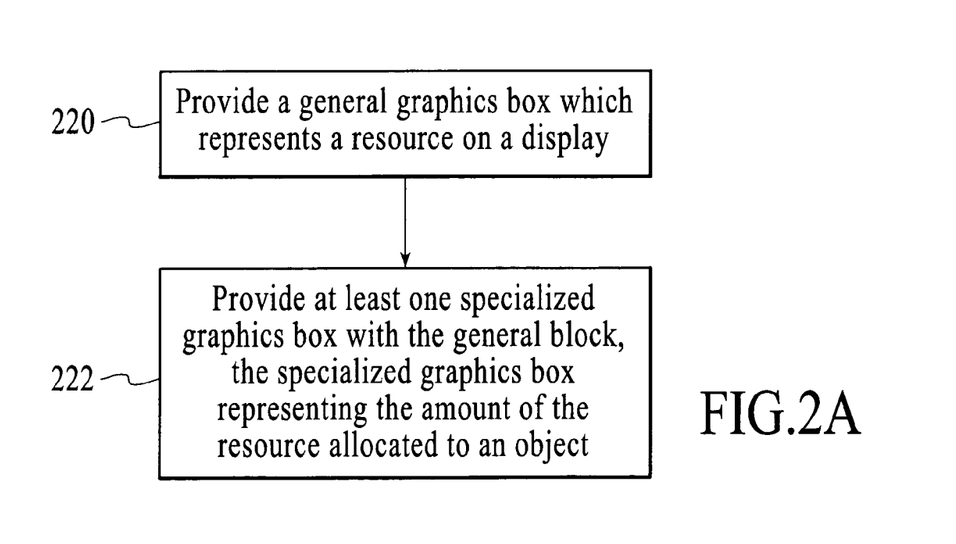
FIG. 2A is a flow chart for monitoring and displaying the use of a resource in accordance with the present invention.

FIG. 2A is a flow chart illustrating the monitoring of a resource in accordance with the present invention. First, a total resource graphic that represents a resource is provided on a display via step 220. Next, at least one specific allocation graphic is provided within the total resource graphic, via step 222.

The specific allocation graphic represents the amount of resource allocated to an object. A direct manipulation of the resource is supported to perform a number of actions via a graphical user interface. These actions include, but are not limited to, direct drag support on the object boxes edges to change the allocation (increase or decrease), a fly-over pop-up window to show the specific value represented (a single-click provides detailed information about the selected object within the object box [in a limited, read-only properties window]), and a double-click on the unallocated portion displays the allocation information in a dialog box.

The graphical user interface provides status information to the user and could be used for, but is not limited to, running processes, file systems, user account usage, partition usage, workload balancing across processors or partitions and printer queue balancing.

An embodiment of the present invention could include, for example, being able to monitor the relative contribution to a user's total portfolio of stocks by cash value at current prices, and using direct manipulation to place, sell or buy orders. Information such as total shares and current prices with daily changes could be viewed in a flyover/pop-up view; additional information on the investment could be made available in the properties dialog box.

EXAMPLE

In this example the available space on a disk (the resource) is monitored as file systems (objects) are allocated to the resource. The following example illustrates the monitoring of available space as the user adds file systems with specific sizes, and the file systems are filled from their initial capacity on the disk. Thereafter, the expansion of the file system will be shown. In addition, some of the specific capabilities in a system and method in accordance with the present invention will be discussed.

Initiate the Display of a Representation of a Total Resource

First, a total resource graphic will be displayed. This initiation of this display is accomplished by selecting from a predetermined set of choices. A resource is represented by initiation of a general graphics box on a display.

Figure 3:
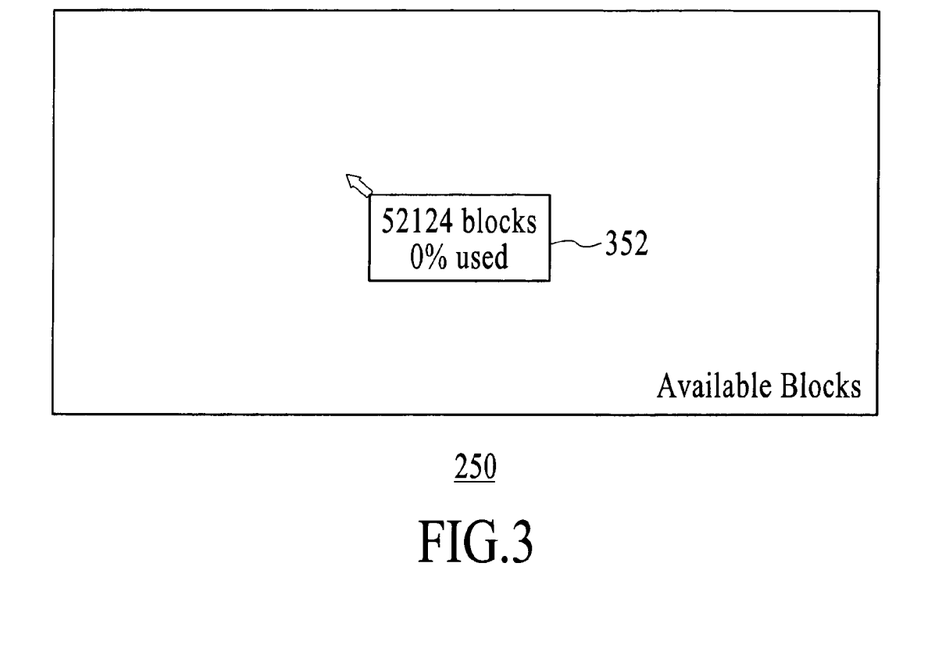
FIG. 3 illustrates the resources, i.e., the volume group, as a general graphic box, for example, which has no file systems yet defined because there are no boxes representing the individual file systems.

FIG. 3 illustrates the resource, i.e., the volume group of the disk, as a total resource graphic 250, for example, which has no file systems yet defined because there are no specific allocation graphics to represent the individual file systems. In addition, a fly over pop-up viewer 352 is shown because the user has placed the cursor on the graphic 250. This indicates, for example, that there are 52124 blocks of 512 bytes each available for use. This value in blocks could also be shown in kilobytes or megabytes if the user desires by setting the measurement type in the properties dialog for the tool.

Define File Systems

Thereafter, file systems are defined. Defining a file system in a preferred embodiment is accomplished by direct manipulation. The user can define a file system using one of the following two methods:

First Method

Figure 4:
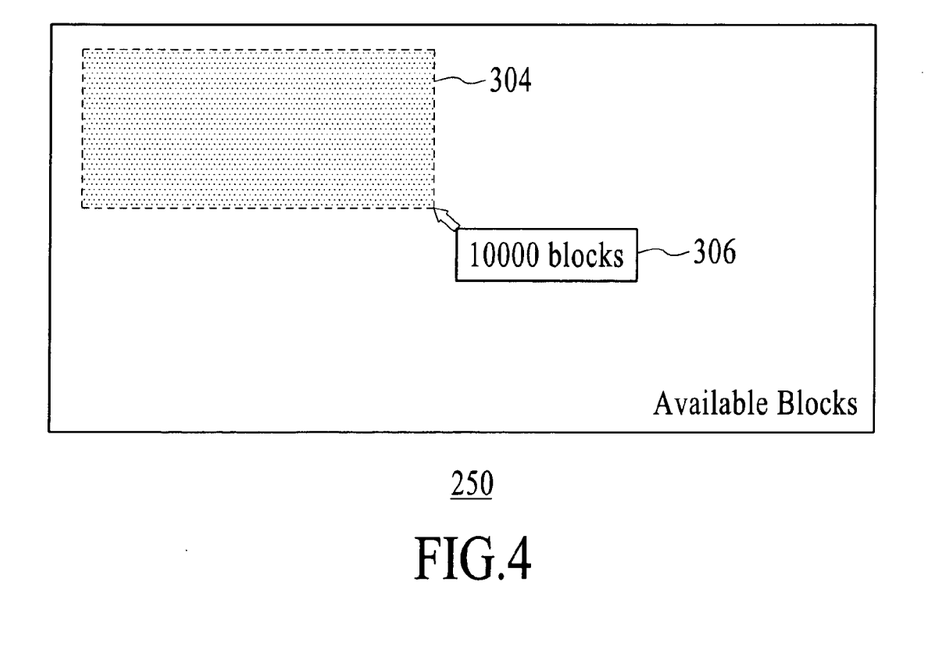
FIG. 4 illustrates the volume group as the object is moved into position.

FIG. 4 illustrates the total resource graphic 250 with a specific allocation graphic 304 representing a file system as it is moved into position. The user moves the pointer into the available blocks space (white area) and presses and holds the left mouse button (in order to make a selection). The user drags the pointer within the space to create a highlighted (dash outline, color, or other indication) rectangle 304. The flyover pop-up viewer 306 indicates the amount of resource being defined. For example, when the user releases the mouse button, the object will have been created and the user will be presented with a properties dialog box for giving the object a name and other characteristics.

Second Method

In a second method, the user double-clicks the available blocks space and the properties dialog appears in order to give the object a name. Choices for additional characteristics, such as size, are also presented.

Regardless of whether the user utilizes the first or second method, once the properties dialog box has been submitted the managed object (in this example, a file system) is created and shown inside the total resource graphic 250.

Figure 5:
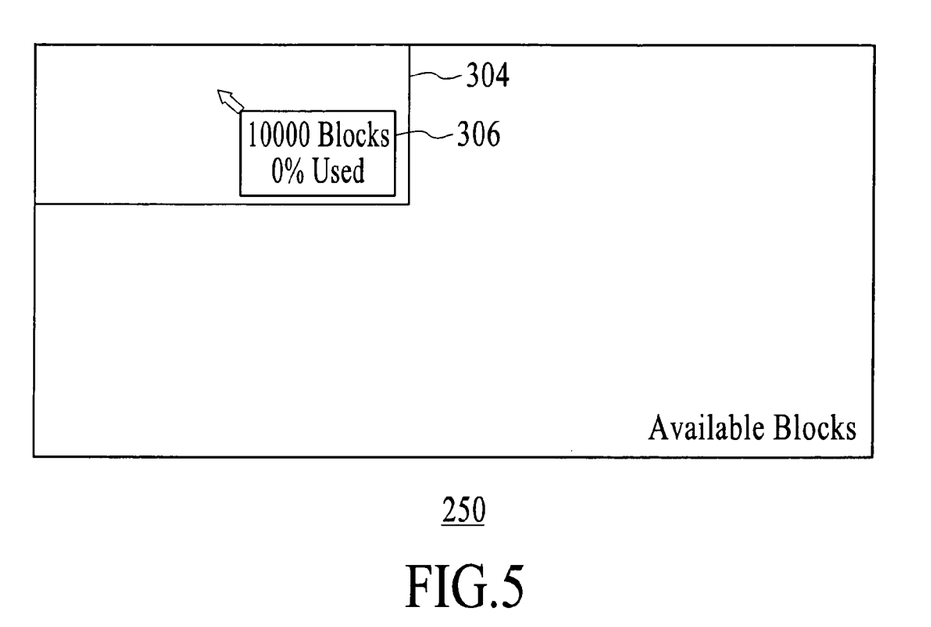
FIG. 5 illustrates the volume group with one file system defined.

FIG. 5 illustrates the total resource graphic 250 with one file system defined as the allocation graphic 304. The allocation graphic 304 of this embodiment illustrates one alpha_test file system of the system utilized within the disk. In addition, the fly over pop-up viewer 306 is shown because the user has positioned the cursor on the allocation graphic 304. This indicates that there are 10000 blocks available for use in the alpha_test file system with 0% used (i.e., the file system was just created and nothing has been placed in it as yet).

Expand A File System

Expanding a file system in a preferred embodiment is accomplished by direct manipulation. It is contemplated that a file system could be expanded utilizing two methods. The two methods will be described below.

First Method

Figure 6:
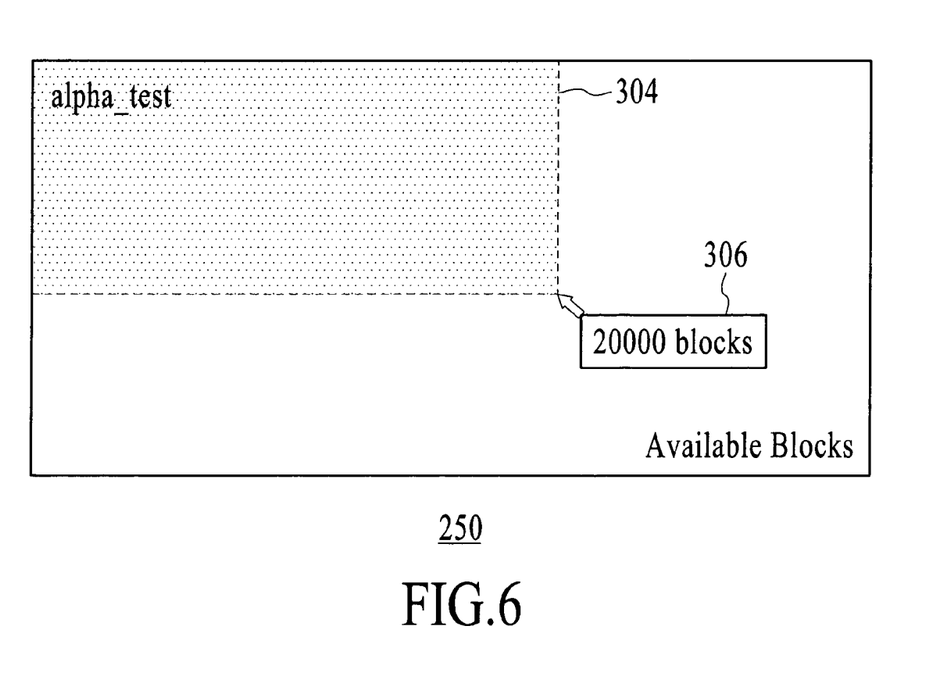
FIG. 6 illustrates a highlighted expanded rectangle as the user is dragging the pointer.

In the first method, the user moves the pointer into the frame of the rectangle for the desired file system and, for example, presses and holds the left mouse button (selection process). The user drags the pointer within the space to create a highlighted (dash outline, color, or other indication) rectangle. FIG. 6 illustrates a highlighted expanded rectangle 304 as the user is dragging the pointer.

The fly over pop-up viewer 306 continuously indicates the amount of resource in the object being expanded. When the user releases the mouse button the object has been expanded.

Second Method

In a second method, the user double-clicks the specific allocation graphic and a properties dialog appears in order for the user to view and modify fields representing the amount of disk space allocated in order to increase the size. When the user submits the dialog box, the allocation graphic increases in area to indicate the increase in allocated disk space.

Regardless of whether the user utilizes method 1 or method 2, the managed object (in this example, a file system) is changed and shown in the resource allocation graphic.

Figure 7:
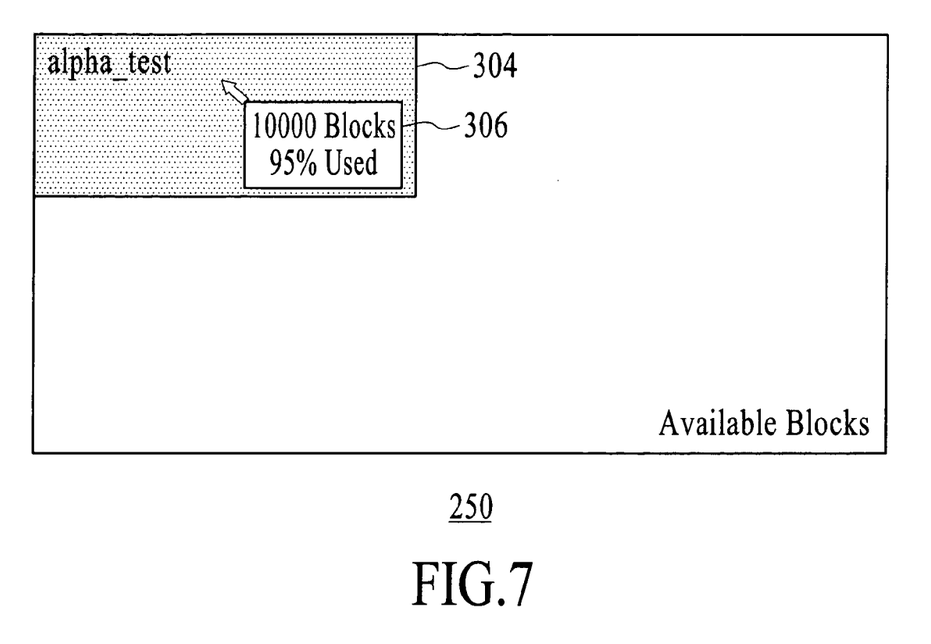
FIG. 7 shows the volume group with an expanded alpha_test system.

FIG. 7 shows the volume group with alpha_test file system 304. In addition, the fly-over pop-up viewer 306 is shown because the user has positioned the cursor on the allocation graphic 304. This indicates that there are 10000 blocks available for use in the alpha_test file system with 95% used. In this instance, allocation graphic 304 for the alpha_test file system has become darker in order to indicate this usage.

The allocation graphic 304 has dashed lines indicating that it is being altered with the direct manipulation of the mouse similar to the creation method 1. This change could also be initiated by double-clicking and editing the values in a properties dialog.

Figure 8:
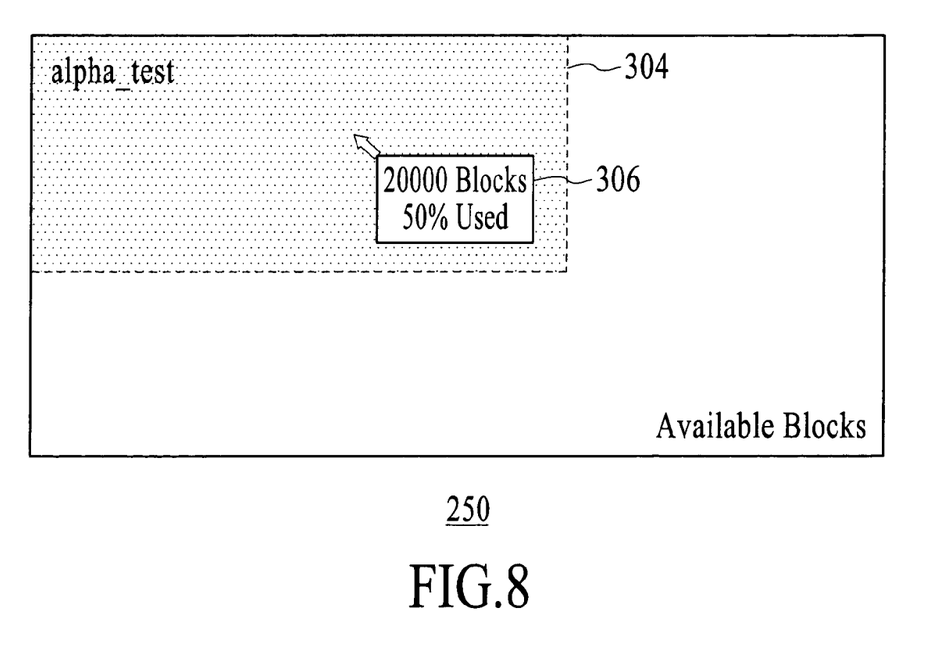
FIG. 8 shows the results of expanding the alpha_test system to a new enlarged capacity.

FIG. 8 shows the results of expanding the allocation graphic 304 for the alpha_test file system to a new enlarged capacity. In addition, the fly-over pop-up viewer 306 is shown because the user has positioned the cursor on the graphic. This indicates that there are 20000 blocks available for use in the alpha_test file system with 50% used. The shading has diminished to indicate about 50% density.

Monitoring Multiple File Systems

Figure 9:
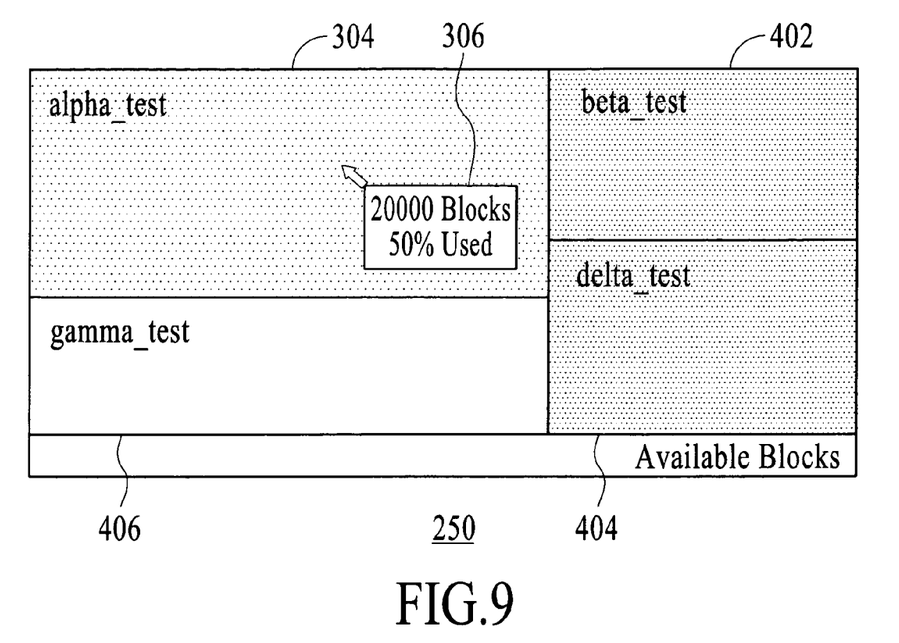
FIG. 9 shows a typical setup to indicate the relative amount of storage used, number of file systems, and usage of the individual file systems.

Monitoring multiple file systems is best accomplished by direct observation. FIG. 9 shows a typical setup to indicate the relative spaces used, number of file systems, and usage of the individual file systems. In this embodiment, the alpha_test file system 304, beta_test file system 402, delta_test file system 404 and gamma_test file system 406 are within the volume 250.

In this instance the user can quickly see that delta_test 404 is near capacity and undertake whatever action might be necessary. The fly over pop-up viewer 306 can still be used as well as direct manipulation.

Trends

A system and method in accordance with the present invention also allows for the indication of trends in the use of allocations of the resource. To further describe this feature refer now to the following discussion in conjunction with the accompanying figures.

Figure 10:
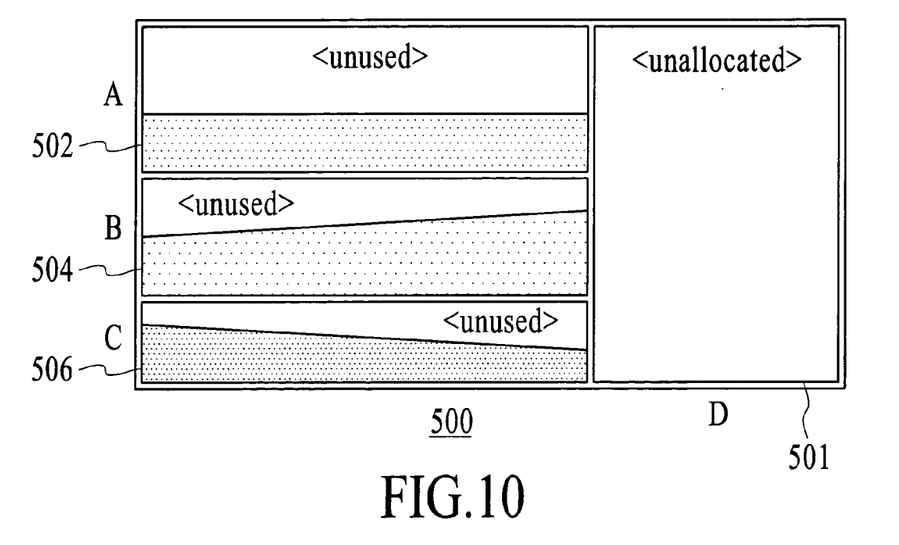
FIG. 10 shows a resource 500 with an object 501 that is complete unallocated to the resource and objects 502, 504 and 506 that have been allocated from the resource.

FIG. 10 shows a resource 500 with an area 501 representing completely unallocated resource, and rectangular objects 502, 504 and 506 that have been created and allocated amounts of the resource. Within objects 502, 504 and 506, the amounts of the allocations that have been used is indicated by shaded regions. The light areas within objects 502, 504 and 506 represents the amounts of the allocations that have not been used. Object 502 represents an object that has used a certain amount of resource, but over time no additional amount of the resource has been consumed. This is indicated by a horizontal edge marking the boundary between used and used portions of the rectangle that reflects the allocation 502.

In the object 504, again a certain amount of resource has been used, and more, of the resource is being used over time. This is indicated by a boundary between the used and unused portions of the object 504 that has a positive slope. In the allocation of the object 506, a certain amount has been used, but over time, the tendency is to mark more amounts as unused than used. For example, if the objects represent disk storage space allocated to users, the user who owns object 506 is deleting more files than he or she is creating. It could also be said that the user who owns object 506 is freeing storage faster than using it.

In each case, the shaded and non-shaded areas are proportional to the total amounts used, unused, and unallocated. Furthermore, the areas of the objects 502–506 and 501 are proportional to their corresponding amount of the resource.

By adjusting the slopes of boundaries between used and unused portions of an allocation, the display could also indicate the rate of use or recycling. Thus a shallow but positive slope would indicate a slow rate of usage while a steep positive slope would indicate a rapid rate of usage. The module that creates the display would adjust the area of the shaded polygons in each case to insure that it remained proportional to the amount consumed.

Figure 11:
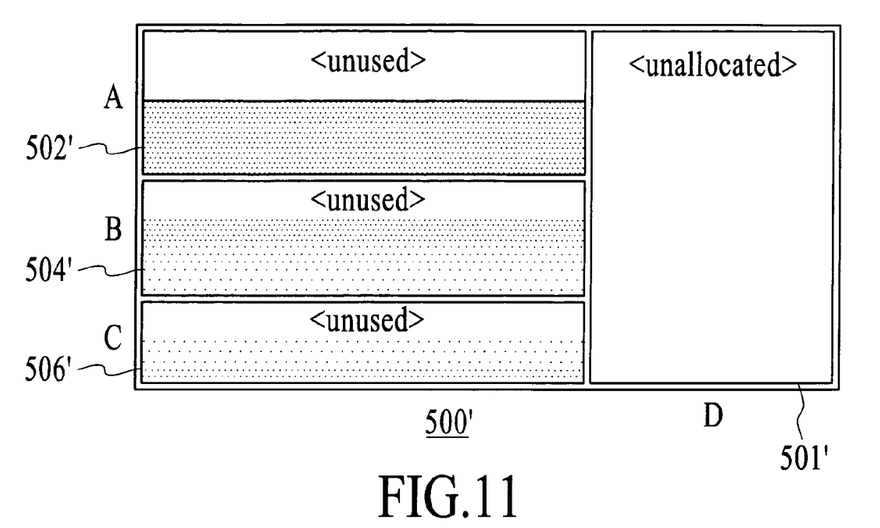
FIG. 11 illustrates a resource 500' that indicates usage and recycling trends by shading gradients.

FIG. 11 represents yet another embodiment. In FIG. 11, the display 500' indicates usage and recycling trends by shading gradients. The object 502' illustrates usage of a resource that is unchanged over time, the object 504' indicates a positive trend of resource usage (the rate of resource use exceeds the rate of resource recycling) and object 506' indicates a negative trend (the rate of recycling exceeds the rate of use).

A positive trend is indicated by a shading gradient in which the most contrasting shade appears at the boundary between the used and unused portions. The visual metaphor is that the used area appears to push up against the unused area. A negative trend is indicated by a shading gradient in which the contrasting shade is opposite the boundary edge between used and unused portions. The visual metaphor here is that the used portion is pulling away from the unused portion.

Rate of use or disuse could be indicated by the steepness of the shading gradient. For example, if the shading gradient in the used portion of the object 504' darkened even more quickly as it approached the used/unused boundary, it would indicate more rapid consumption of the resource.

Figure 12:
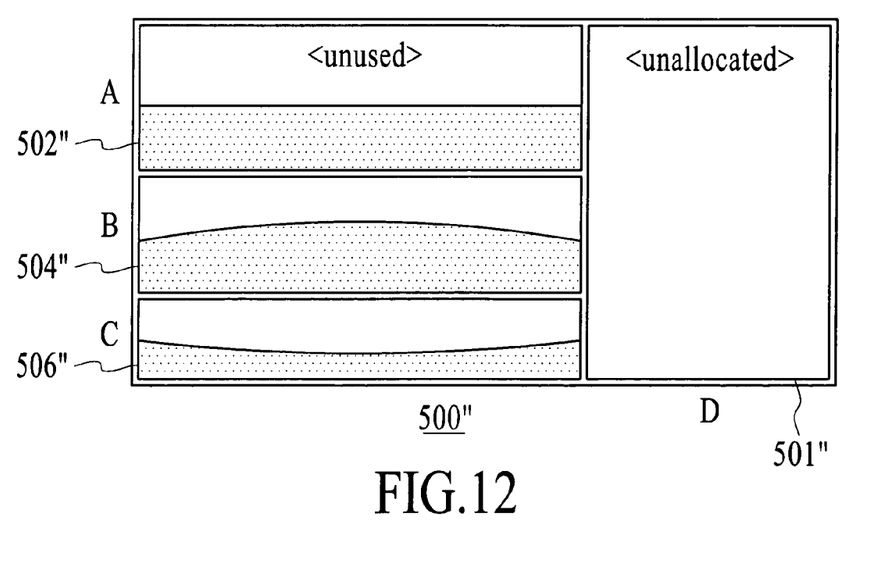
FIG. 12 represents still another method of indicating trends of resource consumption.

FIG. 12 represents still another method of indicating trends of resource consumption. As in the FIGS. 10 and 11, object 502" represents object usage that is unchanging over time, object 504" represents object usage that is increasing, and object 506" represents usage in which recycling outpaces consumption. Again, it would be possible to indicate rates of overall usage by varying the radius of the arc that represents the difference between consumption and recycling. A smaller radius would indicate a greater rate while a larger radius would indicate a slower rate. The module that creates the display of used resource would need to insure that the shaded area was proportional to the amount consumed.

With these indications of positive and negative trends in usage, the user could make better informed decisions about how to change allocations. For example, allocations in which the rate of resource use is less that or is equal to the rate of resource recycling might be reduced while allocations in which the rate of resource use exceeds the rate of resource recycling might be increased. Regardless of the method of displaying the trend, the display would support the ability to change allocates by directly manipulating the display (e.g., by resizing the allocation rectangle). The display might also include the capability of further adjusting itself after such a modification. For example, if one allocation rectangle were resized by increasing its width, the other allocation rectangles could increase their width to match while decreasing their height to maintain a constant area.

Other information could be displayed as well—for example, variability in the usage of resource might be indicated by making the boundary line between used and unused portions appear like a sine wave, with the frequency or amplitude of the wave indicating parameters of variability.

Conclusion

The system and method in accordance with the present invention allows for allocation of a resource across all demands, the relative size of the allocations, and the usage of the resource by the individual demanding operation within a single graphical display. In addition, the object would provide for changes to that allocation by direct manipulation. In addition, a status indicator would provide additional information on demand by the user. The graphical display will provide a single view of the total resource available, the allocation of that resource to individual operations, the amount of the allocated resource to each operation currently in use, and whether or not the rate of resource use exceeds the rate at which it is freed from use.

Therefore, in a preferred embodiment, a computer is used to perform the numeric calculations of the allocations and provides a single picture to the user. The user can then derive information regarding the relative status of any single element. This enables the computer and the user or users to perform the functions for which they are best suited within the operation (computers are best suited to perform calculations; humans users of computers are bested suited to seek patterns and assign relevance to their needs).

Although the present invention has been described in accordance with the embodiments shown, one of ordinary skill in the art will readily recognize that there could be variations to the embodiments and those variations would be within the spirit and scope of the present invention. For example, although the range of fill patterns for the specialized boxes has been described as light to dark, one or ordinary skill in the art recognizes that the range could be depicted in a variety of ways. For example, the range could be depicted by a variety or range of colors, by different patterns or a variety of other ways.

In addition, although a mouse is described as being the user interface for controlling the resource and objects, one of ordinary skill in the art readily recognizes a variety of user interfaces could be used and their use would be within the present invention. For example, the user interface could be a stylus, a touchpad, a voice recognition system or a variety of other user interfaces. Accordingly, many modifications may be made by one of ordinary skill in the art without departing from the spirit and scope of the appended claims.

What is claimed is:

1. A system for monitoring a resource in a processing system, the processing system including a display; the system comprising:

a total resource graphic provided on the display, the total resource graphic representing the resource; and at least one allocation graphic provided within the total resource graphic, the allocation graphic representing the proportion of the resource allocated to an object, wherein the at least one allocation graphic indicates a used portion and an unused portion of the resources of the object, wherein a trend comprises a boundary between the used portion and the unused portion of the at least one allocation graphic, and wherein an indication that more of the resources of the allocated object is being used over time is indicated by a positive slope of the boundary.

2. The system of claim 1 wherein an area of the at least one allocation graphic indicates the amount of resource allocated to the object.

3. The system of claim 1 wherein a fill pattern of the at least one allocation graphic indicates the amount of the resource being used.

4. The system of claim 3 wherein the fill pattern has a range from clear to dark, where a clear fill pattern indicates none of the allocated resource is being used and a dark fill pattern indicates that all of the allocated resource is used.

5. The system of claim 1 wherein the at least one allocated graphic can be expanded or contracted to indicate the amount of resource allocated to the object that has been expanded or contracted.

6. The system of claim 1 wherein the total resource graphic and the at least one allocation graphic are rectangles.

7. The system of claim 1 wherein a pop-up viewer related to the at least one allocation graphic is utilized to indicate numerically the amount of the resource allocated to the object and the amount of the resource being used.

8. The system of claim 1 wherein an indication that less of the resource of the object is being used over time is indicated by a negative slope of the boundary.

9. The system of claim 1 wherein the trend is indicated by a shading gradient across the used portion of the allocation graphic.

10. The system of claim 1 wherein the trend is indicated by a radius of an arc at the boundary.

11. A method for monitoring a resource in a processing system; the processing system including a display, the method comprising the steps of:

(a) causing a total resource graphic on the display to represent the total amount of resource; and (b) causing the at least one allocation graphic to represent a proportion of the total resource allocated to an object within the total resource, wherein the at least one allocation graphic indicates a used portion and an unused portion of the resources of the object, wherein a trend comprises a boundary between the used portion and the unused portion of the at least one allocation graphic, and wherein an indication that more of the resources of the allocated object is being used over time is indicated by a positive slope of the boundary.

12. The method of claim 11 wherein an area of the at least one allocation graphic indicates the amount of resource allocated to the object.

13. The method of claim 11 wherein a fill pattern of the at least one allocation graphic indicates the amount of the resource being used.

14. The method of claim 13 wherein the fill pattern has a range from clear to dark, where a clear fill pattern indicates none of the allocated resource is being used and a dark fill pattern indicates that the entire allocation of resource is used.

15. The method of claim 11 wherein the at least one allocation graphic can be expanded or contracted to indicate the amount of resource allocated to the object that has been increased or decreased.

16. The method of claim 11 wherein the total resource graphic and the at least one allocation graphic are rectangles.

17. The method of claim 11 wherein a pop-up viewer related to the at least one allocation-graphic is utilized to indicate the numerical amount of the resource allocated to the object and the amount of the resource being used.

18. The method of claim 11 wherein an indication that less of the resource of the object is being used over time is indicated by a negative slope of the boundary.

19. The method of claim 11 wherein the trend is indicated by a shading gradient across the used portion of the allocation graphic.

20. The method of claim 11 wherein the trend is indicated by a radius of an arc at a boundary.

21. A computer readable medium containing proper instructions for monitoring a resource in a processing system; the processing system including a display, the program instructions for:

(a) causing a total resource graphic on the display to represent the resource; and (b) causing at least one allocation graphic to represent a proportion of the resource allocated to an object within the total resource graphic, wherein the at least one allocation graphic indicates a used portion and an unused portion of the resources of the object, wherein a trend comprises a boundary between the used portion and the unused portion of the at least one allocation graphic, and wherein an indication that more of the resources of the allocated object is being used over time is indicated by a positive slope of the boundary.

22. The computer readable medium of claim 21 wherein an area of the at least one allocation graphic indicates the amount of resource allocated to the object.

23. The computer readable medium of claim 21 wherein a fill pattern of the at least one allocation graphic indicates the amount of the allocated resource being used.

24. The computer readable medium of claim 23 wherein the fill pattern has a range from clear to dark, where a clear fill pattern indicates none of the allocated resource is being used and a dark fill pattern indicates that the entire allocation of resource is used.

25. The computer readable medium of claim 21 wherein the at least one allocation graphic can be expanded or contracted to indicate the amount of resource allocated to the object that has been increased or decreased.

26. The computer readable medium of claim 21 wherein a pop-up viewer related to the at least one allocation graphic is utilized to indicate the numerical amount of the resource allocated to the object and the amount of the resource being used.

27. The computer readable medium of claim 21 wherein an indication that less of the resource of the object is being used over time is indicated by a negative slope of the boundary.

28. The computer readable medium of claim 21 wherein the trend is indicated by a shading gradient across the used portion of the allocation graphic.

29. The computer readable medium of claim 21, wherein the trend is indicated by a radius of an arc at a boundary.

30. A system for monitoring a resource in a processing system, the processing system including a display; the system comprising:

a total resource graphic provided on the display, the total resource graphic representing the total resource; and at least one allocation graphic provided within the total resource graphic, allocation graphic representing the proportion of the resource allocated to an object, wherein an area of the at least one allocation graphic indicates the amount of resource allocated to the object, wherein a fill pattern of the at least one allocation graphic indicates the amount of the allocated resource being used, wherein the fill pattern has a range from clear to dark, where a clear fill pattern indicates none of the allocated resource is being used and a dark fill pattern indicates that the entire allocated resource is used, wherein the at least one allocation graphic can be expanded or contracted to indicate the amount of resource allocated to the object that has been increased or decreased, wherein the total resource graphic and the at least one allocation graphic are rectangles, wherein the at least one allocation graphic indicates a used portion and an unused portion of the resources of the object, wherein a trend comprises a boundary between the used portion and the unused portion of the at least one allocation graphic, and wherein an indication that more of the resources of the allocated object is being used over time is indicated by a positive slope of the boundary.

\* \* \* \* \*